July 9, 1957  ALBRECHT-WOLF MANTZEL  2,798,525
VEHICLE WHEEL
Filed Sept. 7, 1956  3 Sheets-Sheet 3

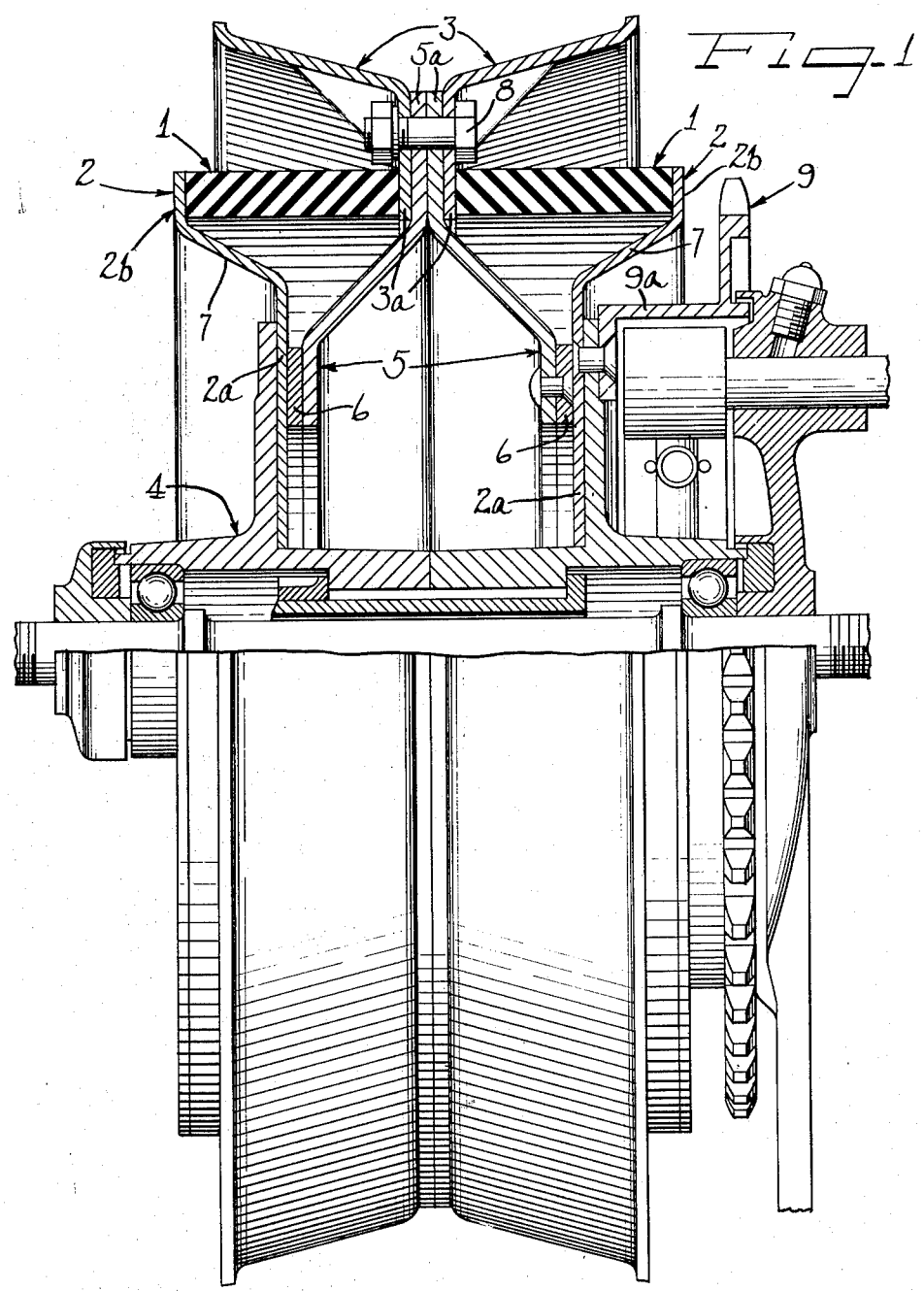

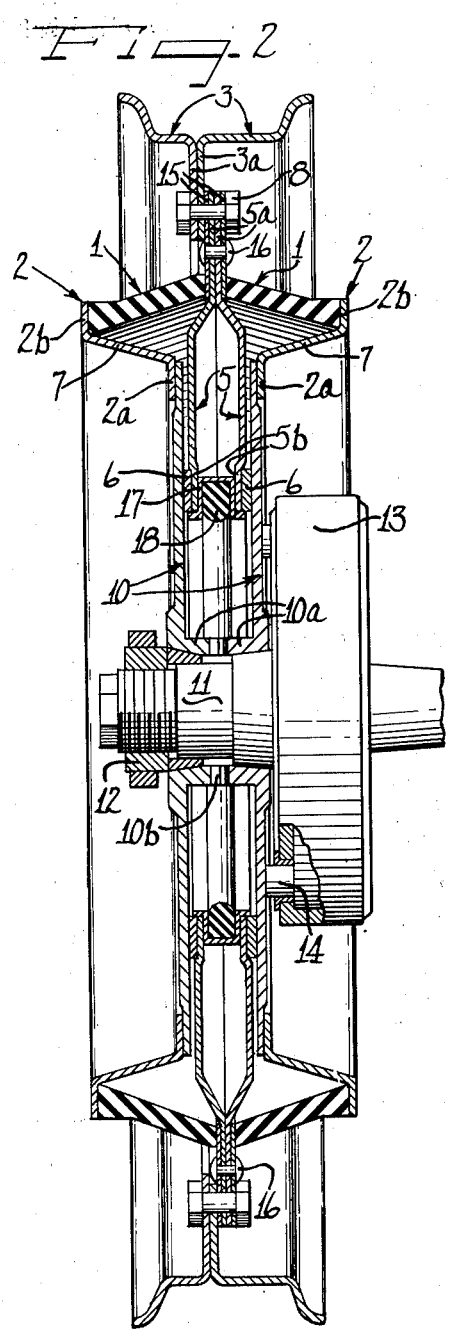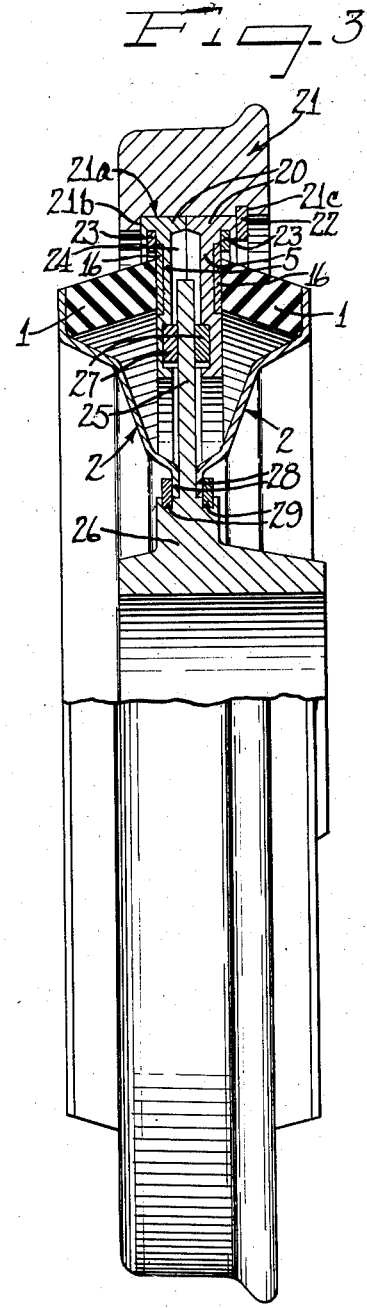

Inventor
Albrecht-Wolf Mantzel
by
Attys

United States Patent Office 2,798,525
Patented July 9, 1957

2,798,525

VEHICLE WHEEL

Albrecht-Wolf Mantzel, Stuttgart, Mohringen, Germany, assignor, by mesne assignments, to Rand-Goetze Corporation, Cleveland, Ohio, a corporation of Ohio Application September 7, 1956, Serial No. 608,605

5 Claims. (Cl. 152—49)

This invention relates to a resilient vehicle wheel or the like, in which laterally extending continuous or discontinuous rings or sleeves of elastomeric material connect hub and rim components of the wheel in such a manner as to accommodate relative radial and circumferential displacements of the components without folding or buckling.

More specifically, this invention relates to a spring wheel wherein preloaded rubber rings or sleeves connect hub and rim components of the wheel and accommodate relative radial and circumferential displacements of the components which simultaneously permits the preloading in certain areas of the rings or sleeves to decrease and in other areas to increase. In the areas where the preloading is decreased during operation, a neutral or no-stress condition may be developed.

In accordance with this invention, laterally or axially extending rings or sleeves of elastomeric material, such as natural or synthethic rubber or the like, are provided on opposite sides of the medial plane of the wheel. Each ring has one end thereof secured to a hub component, and the other end thereof secured to a rim component. The rings are substantially longer or wider than thick and are mounted relative to the hub and rim components in a preloaded or pre-stressed condition. Any type of pre-stressing or preloading may be employed which permits the development of no-stress areas in the rings. Compressive loading is preferred since it generally increases the wear life of the rings and improves the lateral stability of the wheel.

It is preferred to provide large diameter rings closely adjacent the rim of the wheel with the hub-connected component extended radially outwardly to provide a generally annular anchor for one side of its associated elastomeric ring, thus placing the entire ring near the rim to stabilize the wheel against relative axial displacement of the hub and rim.

A preferred embodiment of the invention includes the mounting of rings in inclined relation to each other so as to provide an included obtuse angle therebetween of less than 180°. The rings can be either deformed into inclined relation when assembled on the wheel or can be preformed in conical shape. The resulting conical or inclined ring arrangement is especially desirable when, in the preferred form of this invention, the rings are compressively preloaded since radial displacement of the hub and rim components will tend to deform the rings into cylindrical shape adjacent the point of application of the load. The deformed ring portions will be further compressed and thus rigidified to resist lateral deflections of the hub and rim components thereby stabilizing the wheel.

The laterally extending rings can be in the form of continuous rings or sleeves or in the form of circumferentially spaced segments or blocks but, in all embodiments of the invention, the rings have the shape of a surface of revolution in which the generatrix is a straight line and lies in the same plane as the axis of revolution. The rings provide straight line connections between the hub and rim parts and have intermediate portions of appreciable length or width which are unsupported in normal operating positions of the hub and rim components. Further, the rings are wider than thick so that they act in tension or compression but not in shear.

If desired, the hub and rim components can carry guides adapted to slidably cooperate for holding the components in alignment although these guides may be dispensed with by proper positioning and pre-stressing of the rings in accordance with this invention.

It is then an object of this invention to provide a spring wheel having preloaded elastomeric rings or sleeves connecting rim and hub components while accommodating relative radial and circumferential displacements of the components.

A further object of this invention is to provide a spring wheel wherein continuous or discontinuous elastomeric rings extend laterally between hub and rim components of the wheel, are secured at their ends only to join the components through their lengths, and are pre-compressed to connect the hub and rim components and allow radial and circumferential displacements thereof.

Another object of this invention resides in the provision of a vehicle wheel having hub and rim components connected by rubber rings or sleeves, wherein the rings are pre-stressed or preloaded in a manner which permits the development of no-stress areas during relative radial and circumferential displacements of the components.

Still another object of this invention is to provide a vehicle wheel having hub and rim components connected by preloaded rubber rings or sleeves that accommodate relative radial and circumferential displacements of the components which simultaneously permits the preloading in certain areas of the rings to decrease and in other areas to increase.

A still further object of this invention is to provide a vehicle wheel having the hub and rim components thereof joined by inclined rubber rings which define an included obtuse angle of less than 180° and which will be deformed to increase the included angle in the area adjoining the point of application of load while decreasing the included angle in the diametrically opposed area.

A still further object of the invention is to provide a preloaded rubber ring connection between hub and rim components of a vehicle wheel adjacent the rim component.

Other and further objects of this invention will be apparent to those skilled in the art from the following detailed description of the annexed sheets of drawings which, by way of examples only, show preferred embodiments of this invention.

On the drawings:

Figure 1 is an end elevational view with parts in vertical cross-section of a vehicle wheel according to this invention.

Figure 2 is a longitudinal cross-sectional view of a vehicle wheel according to this invention equipped with interchangeable rim and inclined rubber rings.

Figure 3 is an elevational view with parts in vertical cross-section of a rail vehicle wheel according to this invention.

As shown on the drawings:

Figure 4:
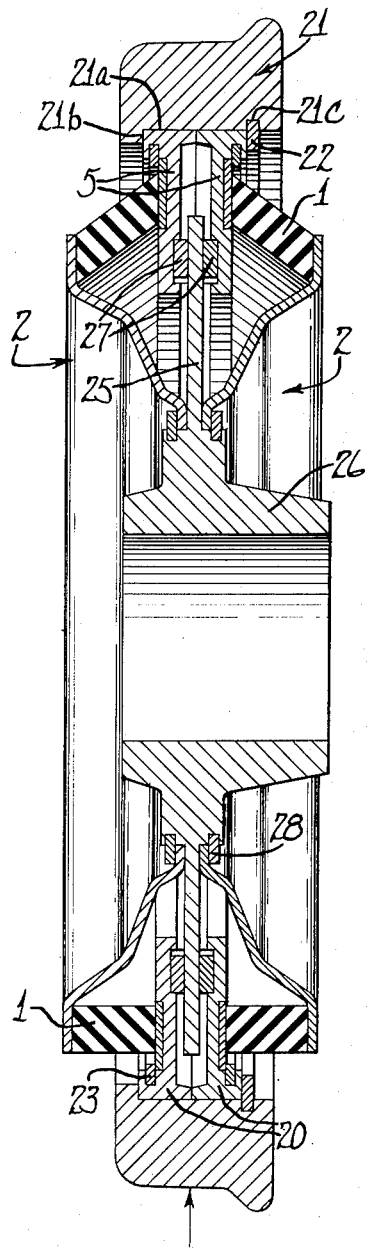
Figure 4 is a vertical cross-sectional view of the rail wheel of Figure 3 showing the positions of the parts when the wheel is loaded radially in the direction of the arrow.

The vehicle wheel of Figure 1 is especially suitable for motorcycles or the like relatively light weight vehicles, The springing of the wheel is effected by two cylindrical rubber rings or sleeves 1 which are bonded, adhesively connected by vulcanization, or otherwise suitably secured at their outer ends with hub-carried guiding disks 2 and on their inner ends with ring flanges 3a of rim components 3. The guide disks 2 are rigidly connected with a hub body 4 which is rotatably supported on the wheel axle as shown.

Supporting disks 5, having radial peripheral flanges 5a between the flanges 3a of the rim part 3, diverge outwardly from the radial peripheral flanges to radially extending inner peripheral portions carrying sliding rings 6 on their outer faces. These sliding rings 6 ride on the inner faces of the guiding disks 2 to laterally stabilize the rim part 3 relative to the hub part 4. The guide disks 2 have inclined or domed portions 7 diverging outwardly from their radially extending inner peripheral portions 2a to radial outer peripheral flanges 2b for spacing the flanges 2a outwardly from the flanges 3a. Hence, it is seen that axial separation between the hub and rim parts is prevented since they are in nested relation.

The flanges 5a of the disks 5 and the flanges 3a of the rim 3, are bolted together by bolts such as 8.

It will be noted that the sliding rings 6 and the inner surfaces of the guide disks 2 on which these rings 6 ride, are sealed off from the atmosphere by the rubber rings 1 which form the spring connections between the hub and rim parts.

The hub 4 is driven by a sprocket 9 and this sprocket merges with a brake drum portion 9a housing the braking elements.

By regulating the forms of the supporting disks 5 and guiding disks 2 as, for example, by regulating the extent of the inclined or domed portions 7 of the guiding disks 2, it is possible to control the spacing of the surfaces on which the ends of the rubber rings 1 are secured thereby controlling the axial length or width of the rubber rings. It is noted that these rings, are longer or wider in their axial direction than thick in their radial direction.

In assembling of the wheel, the rubber rings 1 are prestressed or preloaded, in axial compression or tension, and then secured at their opposite ends between the hub components 2 and the rim components 3. This necessitates the normal free axial width of the rings to be greater or smaller than the distance between the securing points on the hub components 2 and the rim components 3. Preferably, the rubber rings are preloaded by axial compression which increases their wear life by reducing their rate of ozone oxidation. Further, precompressed rubber is much less susceptible to abrasion. While rubber in compression may heat more than unstressed or tensioned loaded rubber, nevertheless, in the wheels of this invention, the rubber rings have large heat radiating surfaces which preclude overheating.

The preloading of the rubber rings is easily accomplished since the bonded areas at the axially opposite ends of the rubber rings are sufficiently great to maintain the rings in a straight line condition thereby insuring against bowing or buckling.

In operation of the wheel of Figure 1, the hub and rim components 3 and 4, can deflect radially and circumferentially relative to each other through flexing of the rubber rings 1 without ever bowing or folding the rings. The lateral stabilizing effect created by the slide rings 6 prevents axial displacements of the hub and rim components but in instances where the slides are eliminated, the stressed rubber rings are effective to hold the rim and hub components in alignment. Where the outer ends of the rings are secured to the hub components, and the inner ends are secured to rim components, increased stabilization against cocking of the parts is achieved.

In the preferred wheels of this invention, under maximum radial and circumferential displacements of the rim and hub components, the preloaded rubber rings 1 may develop neutral or no stress areas.

When the wheel is operating under load, whatever initial stress or preload is imparted to the rubber rings, the initial stress in areas at one side of the rings will increase while the initial stress at the diametrically opposite areas will decrease.

Since the rings 1 in Figure 1 are in the form of true cylinders, relative deflection of the hub and rim components occur upon rather light loading of the wheel thereby giving a very "soft" ride.

If a stiffer ride condition is desired, the rubber rings 1 can be inclined or conically shaped as shown in the embodiments of Figures 2 and 3 wherein corresponding parts have been marked with the same reference numerals. In these embodiments, the rings are frusto-conical with their larger ends facing each other.

In the wheel of Figure 2, the vehicle wheel has the guiding disks 2 equipped with relatively narrow inner peripheral flanges 2a secured to inner hub parts 10 with axially extending thickened collars 10a interlocked at 10b and forming a double conical hub on the wheel axle 11. An axle nut 12 clamps the parts together on the axle. The brake drum 13 may be connected by suitable lugs or driving members 14 with one of the hub parts 10.

Instead of securing the rubber rings 1 directly on the rim flanges 3a, separate metal securing rings 15 are provided. These rings receive the disk flange 5a therebetween and are held together by rivets 16. This assembly is then bolted to the rim flanges 3a by the bolts 8.

As shown in Figure 2, the rubber rings 1 in the unloaded state of the wheel, are inclined to define therebetween an included obtuse angle. In this arrangement, when the hub and rim parts are radially deflected, the rings 1 in the loaded area of the wheel, tend to increase the obtuse angle therebetween. If the rings are initially pre-compressed, the increase of the obtuse angle will result in further compression and stiffening of the rings against further deflection.

As shown, the ends of the rings 1 are greatly enlarged or thickened at the fastening areas to prevent any tendency of detachment and to facilitate compression of the rings without buckling.

The inner peripheral margin portions 5b of the disks 5 are inwardly offset to receive the slide rings 6 which ride on the inner faces of the hub disks 10. These portions 5b receive a grooved ring 17 therebetween which carries a rubber bumper ring 18 adapted to engage the hub collars 10a upon excessive radial deformation of the hub and rim components. In normal operation of the wheel, however, the bumper will always be in spaced relation from the hub.

The slide rings 6 are preferably composed of a self-lubricating material such as sintered metals, synthetic resins, or the like, in which are incorporated friction-reducing material such as graphite.

When assembling the rubber rings or sleeves 1 in the wheel, the rings, if normally cylindrical in their free state, will be deformed into their inclined relation since the mounting rings 15 to which the inner ends of the rubber rings 1 are affixed, have a greater diameter than the flanges 2b of the disks 2 on which the outer ends of the rings are secured. Alternately, the rings, as above described, may be frustoconical in their normal free state. In either case, the rings will be frusto-conical when mounted in an assembled wheel which is not under load. The width or length of the rubber rings 1 is sufficient so that upon being inserted between the disks 2 and 5, the rubber rings will be given a sufficient initial stressing, preferably compression.

Figure 5:
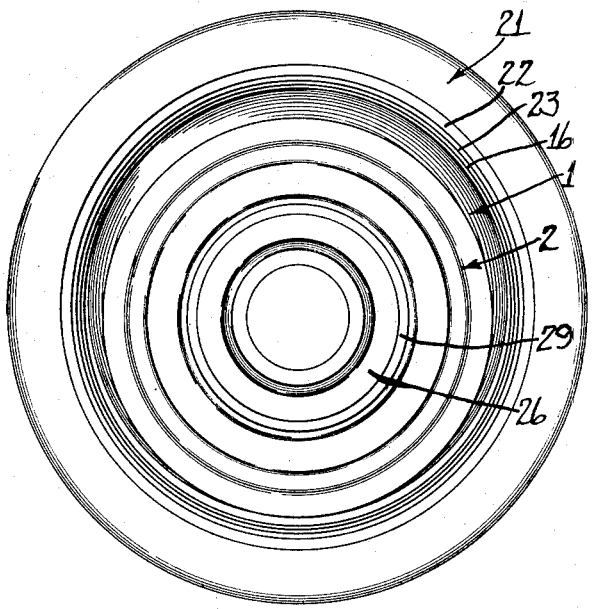
Figure 5 is a face or plan view of the wheel of Figure 4 showing the eccentric relation of the loaded wheel parts.

In the embodiment shown in Figures 3, 4 and 5, parts equivalent to parts described in the embodiments of Figures 1 and 2, have been identified by the same reference numerals.

As shown in Figures 3 to 5, the supporting disks 5 have rim portions 20 coacting to define a circular periphery on which is mounted a rail type rim 21. The rim 21 has a cylindrical bore 21a receiving the rim portions 20 of the disks 5. A shoulder 21b bottoms the rim portions and a groove 21c in the bore receives a lock ring 22 to hold the disks 5 within the rim 21.

These disks 5 have recessed outer faces receiving the metal rings 16 to which are secured the inner ends of the conical rubber sleeves 1.

Grooves in the rim portions 20 receive snap rings 23 locking the rings 16 to the disks 5.

The disks 5 define therebetween a hollow space 24 receiving the flange 25 of a hub component 26. Slide rings 27 carried in grooves provided in the innerfaces of the disks 5 engage the flange 25 in slidable relation to hold the hub and rim components against axial displacements.

The disks 2 anchored to the outer ends of the rings 1, have inner peripheral margins 28 bottomed on opposed faces of the flange 25 at the hub 26 and held thereon by snap rings 29 engaged in grooves on the hub.

In this embodiment, therefore, the sprung part of the wheel consists of the supporting disks 5 on the outer portion of which is mounted the rail rim 21. However, this rail rim can be replaced by a pneumatic tire-carrying rim. The rubber rings or sleeves 1 have their inner ends connected to the supporting disks 5 through the mounting rings 16 and the snap rings 22. The slide rings 27 can be in the form of packing rings and the hollow space 24 can be filled with a suitable cushioning material such as oil, to provide an impact dampener.

In mounting the rubber rings or sleeves 1 on the wheel, the rings are preferably initially shaped or deformed to the conical shape shown in Figure 3 so that the two rings on opposite sides of the medial plane of the wheel, define an included obtuse angle with the inner major diameter portion of the rings secured to the rim component of the wheel and the outer minor diameter portion of the rings secured to the hub component of the wheel. The rings are compressibly loaded and are thick enough to be reduced in length or width from 5 to 15% without buckling. This initial stressing of the sleeves, as explained above, greatly enhances the wear life of the wheel.

As illustrated in Figures 4 and 5, when the wheel is radially loaded as when the bottom portion thereof engages the ground, the area of the rings 1 adjacent the point of application of the load, will be flattened toward a cylindrical shape as shown. The diametrically opposed areas of the rings will be further arched to decrease the obtuse angle therebetween. The flattening of the rings in the area where the load is applied will further compressibly load these rings to stiffen the rubber and more effectively resist axial displacements of the hub and rim components. At the diametrically opposed area, the compression loading of the rings will likewise be decreased and possibly even to the extent of developing a no-stress condition in this area.

The increased rigidity of the flattened ring areas due to the increased compression loading at these areas, will hold the rim and hub components against cocking even when the wheel is not equipped with the slide rings or guide members.

Since the rubber rings, especially when compressibly loaded, will hold the hub and rim components against axial deflections, the slide rings 6 can be spaced from the opposed riding surfaces or as explained above, the guide can be eliminated entirely.

Figure 6:
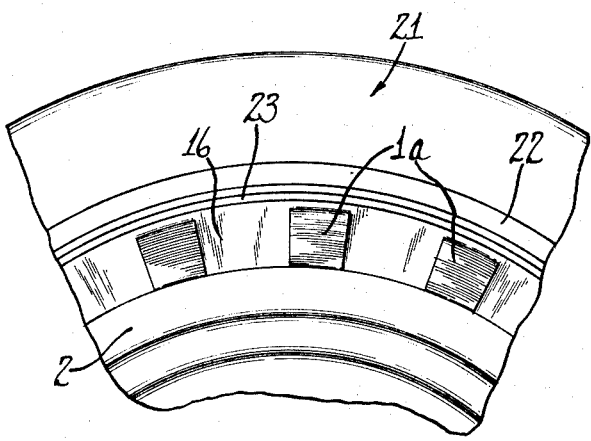
Figure 6 is a fragmentary view similar to Figure 5 but showing the wheel equipped with discontinuous rubber rings or sleeves.

In the embodiment of the wheel shown in Figure 6, the continuous rubber rings or sleeves 1 are replaced by discontinuous rings in the form of circumferentially spaced rubber blocks 1a having inner ends anchored to the guide disks and outer ends anchored to the hub-carried disks as in the case of the continuous rubber sleeves 1. These discontinuous rings are vulcanized or otherwise anchored to their mounting rings. As in the case of the continuous rings 1, the discontinuous rings 1a are preferably pre-compression loaded and are in inclined relation so they define, on opposite sides of the medial plane of the wheel, an included obtuse angle. These discontinuous rings 1a are wider or longer than thick. Because of this construction, the rings will not fold while accommodating radial and circumferential displacements of the rim and hub parts.

From the above description it will be understood that the wheels of this invention have hub and rim components connected together only through the media of elastomeric rings or sleeves which are initially pre-stressed, preferably pre-compressed, to accommodate radial and circumferential displacements of the hub and rim components. Two rings are preferably mounted in spaced-opposed relation on opposite sides of the medial plane of the wheel and extend laterally outward, preferably along inclined paths, so that the included angle therebetween is an obtuse angle.

In cases where a softer ride is desired, the opposed rings can be cylindrically shaped and mounted so that the angle therebetween is 180°. When the wheels are radially loaded, the inclined rings flatten toward cylindrical configuration and are thereby further compressibly loaded to resist cocking of the hub and rim components. While the illustrated embodiments of the wheels include axial guides or stabilizers to hold the hub and rim components in alignment, these devices can be eliminated without rendering the wheel unstable provided that the rings are sufficiently pre-stressed to resist axial displacements of the hub and rim.

This application is a continuation-in-part of my application Serial No. 249,300, filed October 2, 1951.

It will be understood that variations and modifications may be effected without departing from the scope of the novel concepts of this invention.

I claim as my invention:

1. A wheel which comprises a hub part, a rim part, means radiating from said hub part and providing axially spaced first anchorages adjacent the rim and radially nearer to the rim than to the axis of the wheel, means on said rim part providing second anchorages each associated with a first anchorage in generally axially aligned, inwardly spaced, relationship thereto, a pair of opposed elastic sleeves each extending substantially axially of the wheel, and being related to each other such that the included angle therebetween is a wide obtuse angle, each sleeve having an axial outer end secured to a first anchorage and an axial inner end secured to a second anchorage, each sleeve having the shape of a surface of revolution in which the generatrix is a straight line and lies in the same plane as the axis of revolution and which shaped sleeve provides straight line connections between the anchorages which will not fold while accommodating radial and circumferential displacements of the hub and rim parts, each sleeve having its intermediate portion between said anchorages unsupported, the width of said intermediate portion in the axial direction being in the range of two to five times as great as its thickness in the radial direction, said sleeve forming a vertical column of elastic material of substantial cross-section across vertically extending chords at the "three-o'clock" and "nine-o'clock" positions of the wheel, and said anchorages being so spaced with relation to the free lengths of the sleeves as to hold the sleeves under stress in the axial direction at all times, whereby said hub part is supported from said rim part through unsupported lengths of the elastic sleeves and the wheel is laterally stabilized by said stressed sleeves, by the obtuse angular relation of the sleeves and by the spacing of said first anchorages axially outwardly from said second anchorages.

2. The wheel of claim 1 in which each sleeve in its unloaded state is a hollow frustum of a cone having the large end axially inward from the small end thereof.

3. The wheel of claim 1 including coacting radially shiftable restraining means respectively carried by the hub and rim parts and holding said parts against relative axial displacement while accommodating relative radial and circumferential displacement of the hub and rim parts.

4. The wheel of claim 1 in which said first and second anchorages are in radially overlapping relationship, whereby to prevent axial separation of said hub and rim parts in the event of failure of said elastic sleeves.

5. The wheel of claim 1 including a securing ring associated with at least one of said anchorages, an axial end of one of said elastic sleeves bonded to said securing ring, and means securing said securing ring to its associated anchorage, whereby the manufacture and assembly of said elastic sleeves under initial stress is facilitated.

References Cited in the file of this patent

UNITED STATES PATENTS

| | | |
|---|---|---|
| 165,587 | Jeantaud | July 13, 1875 |
| 472,856 | Carmont | Apr. 12, 1892 |
| 1,069,941 | Grigg | Aug. 12, 1913 |
| 1,071,953 | Picard | Sept. 2, 1913 |
| 1,096,467 | Spelshouse | May 12, 1914 |
| 1,446,922 | Morse | Feb. 27, 1923 |
| 1,884,780 | MacLean | Oct. 25, 1932 |
| 2,463,226 | Walden | Mar. 1, 1949 |
| 2,525,333 | Augustin | Oct. 10, 1950 |
| 2,555,023 | Boschi | May 29, 1951 |